L. FAUST & F. G. HOGLAND.
MORTISING MACHINE.
APPLICATION FILED JAN. 27, 1906.
955,834.
Patented Apr. 19, 1910.
5 SHEETS—SHEET 4.
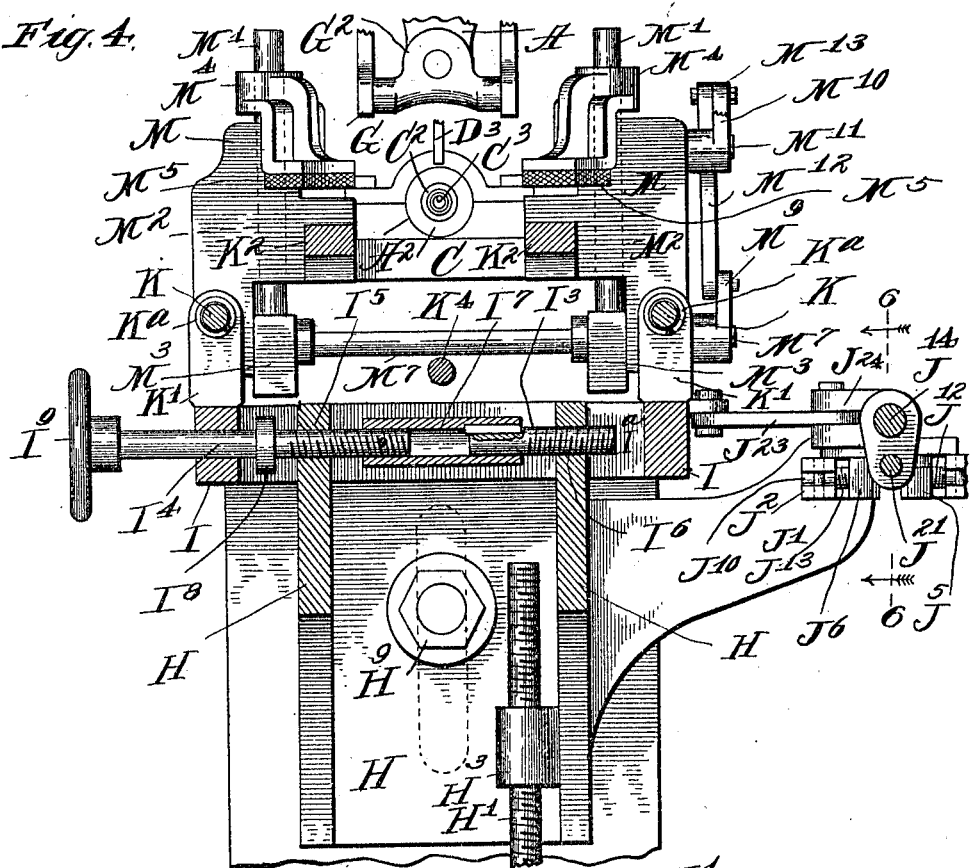
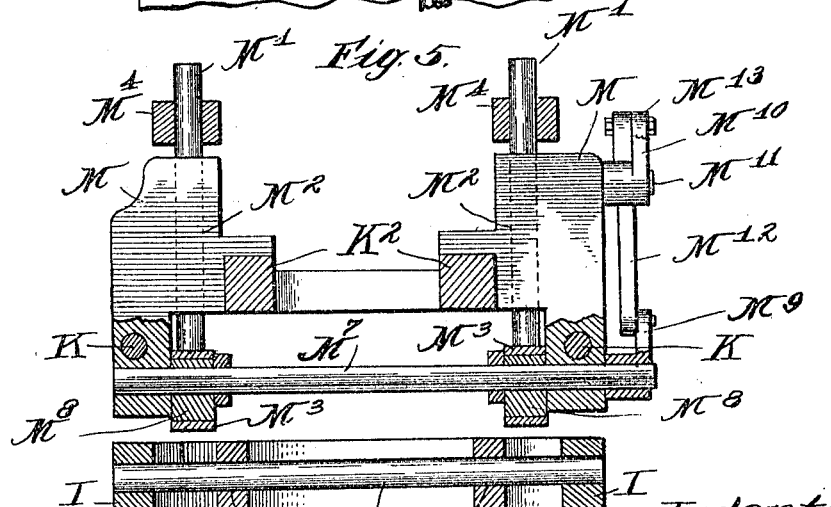

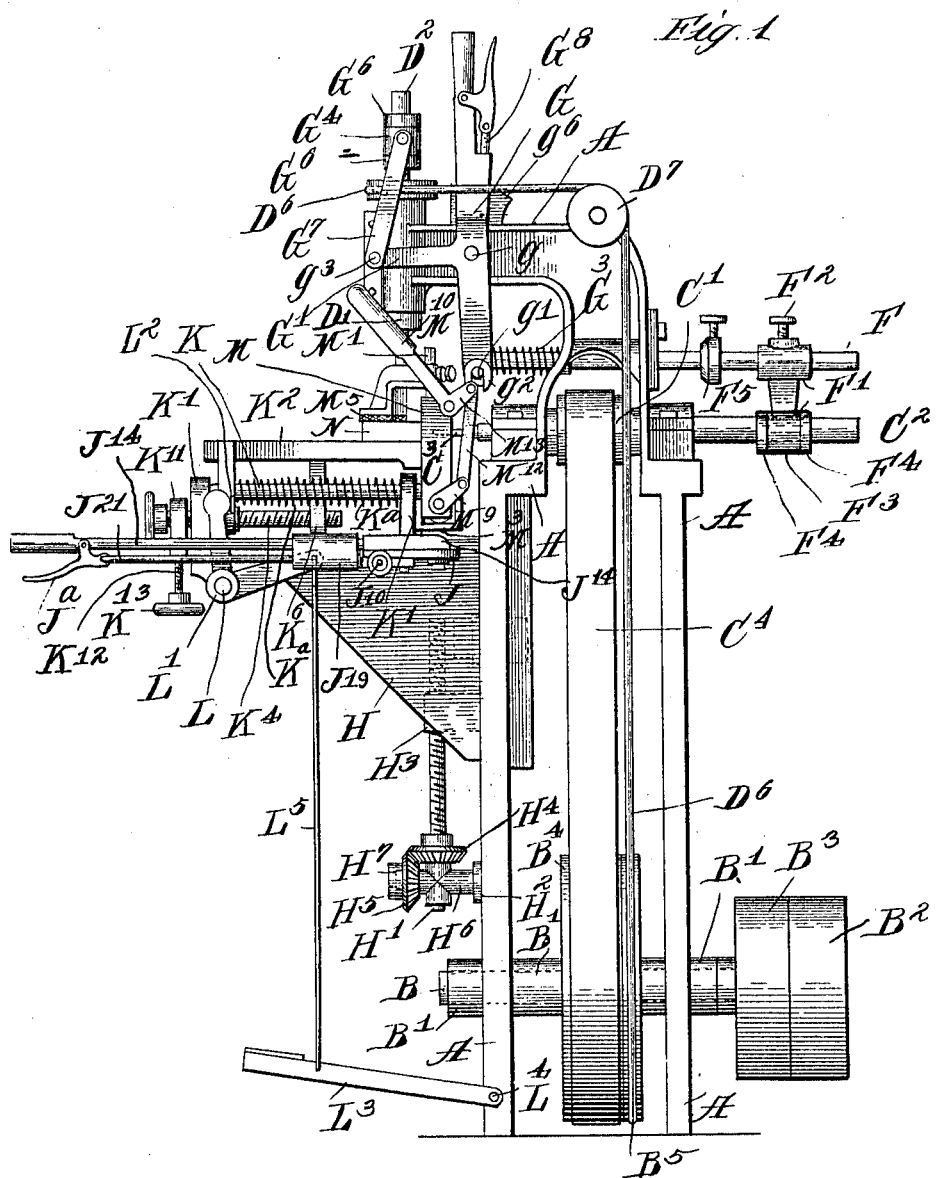

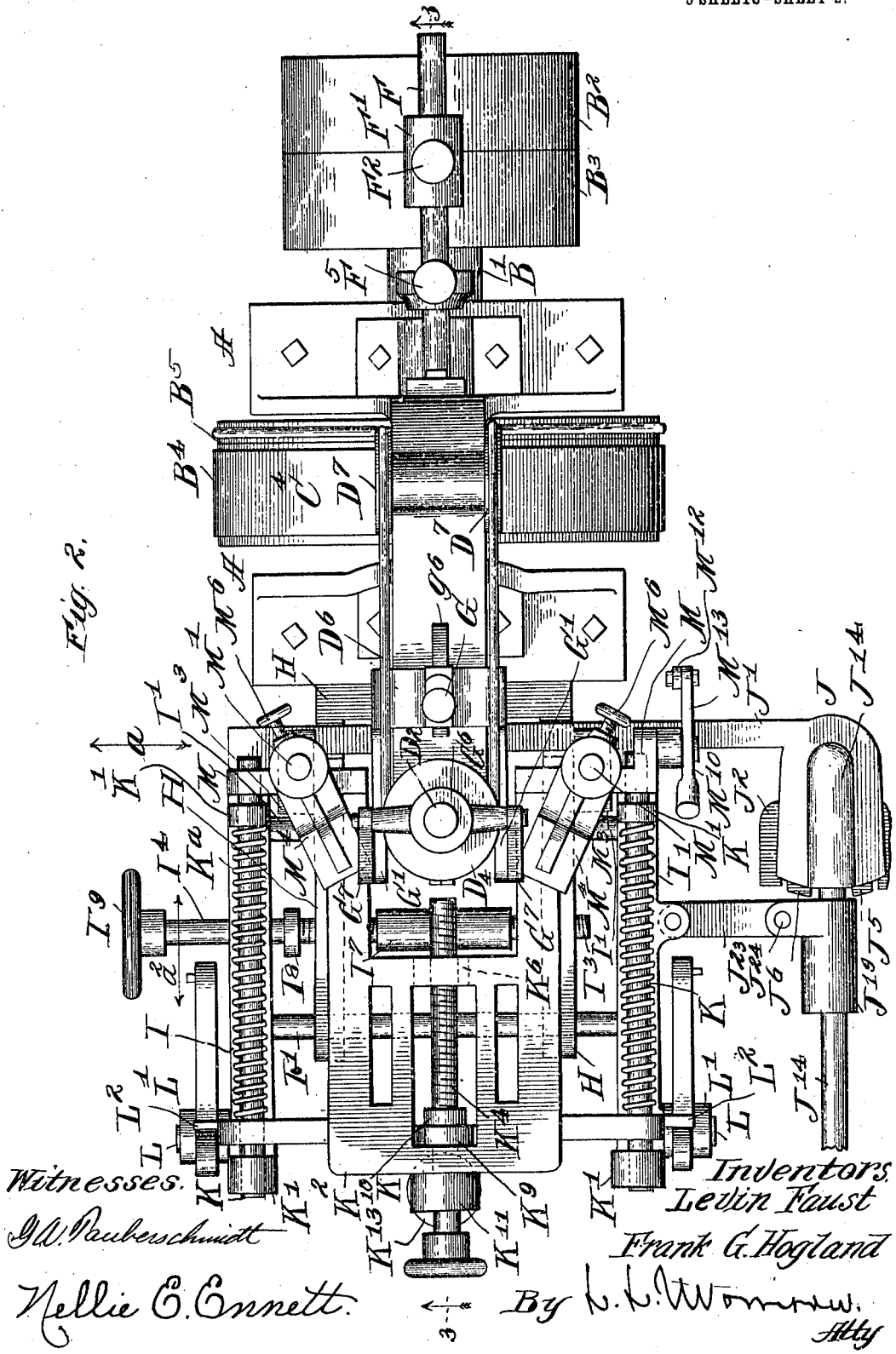

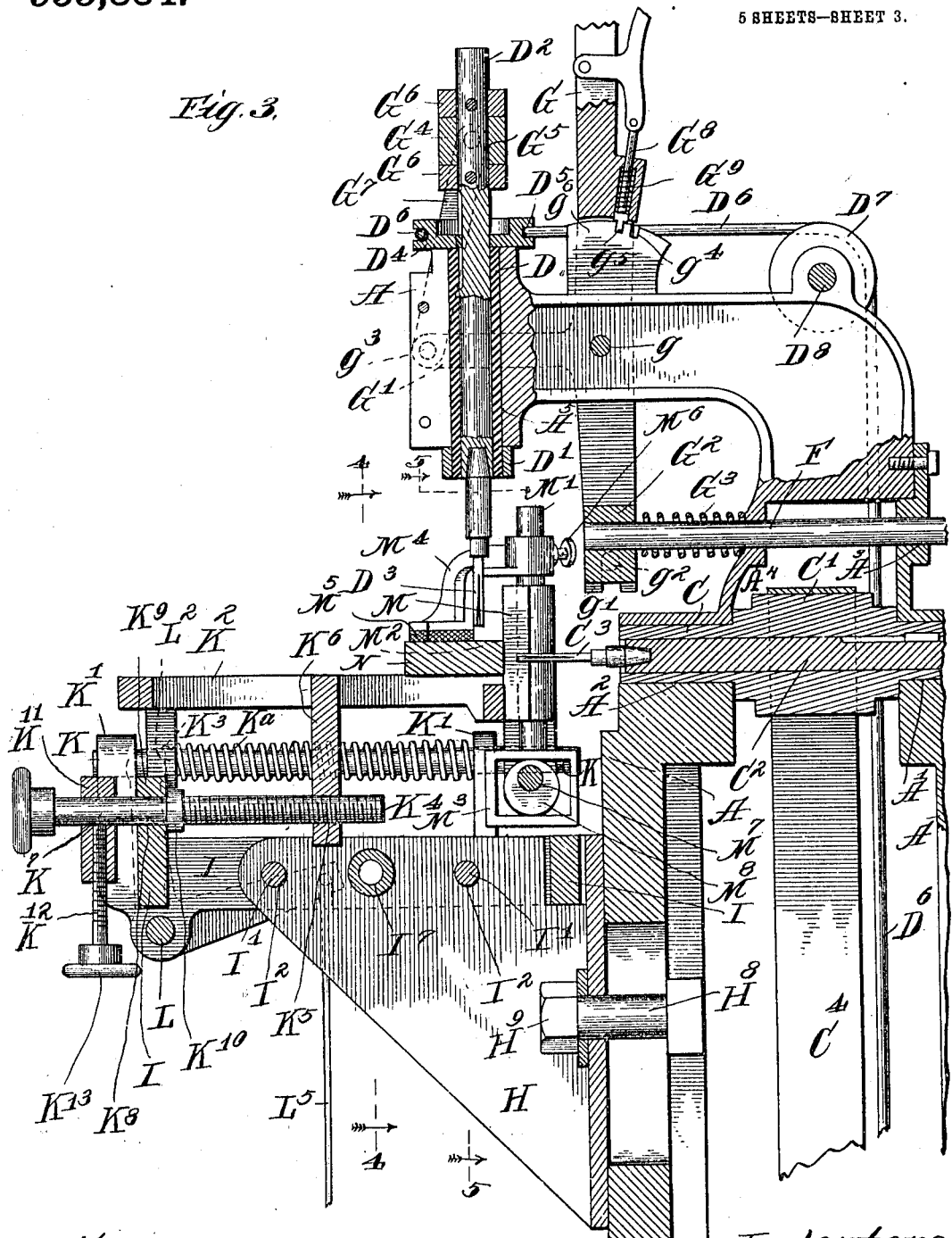

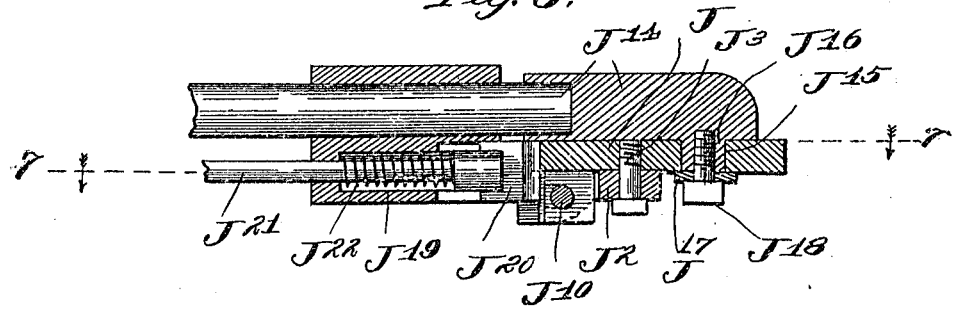
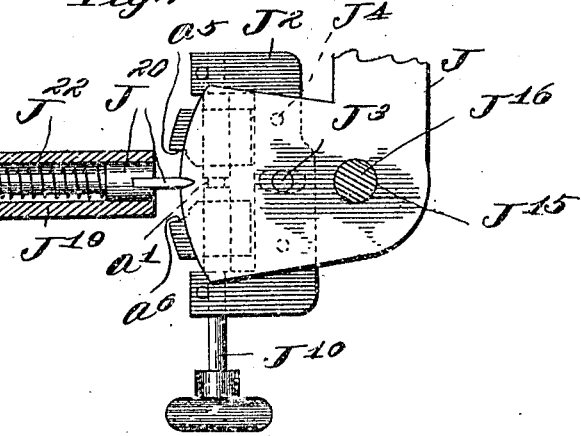
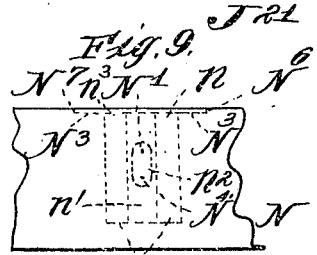
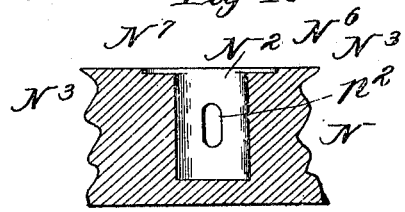
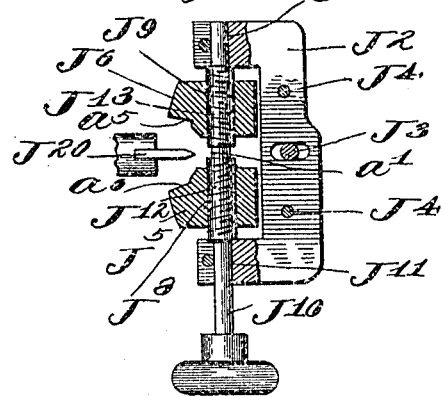

UNITED STATES PATENT OFFICE.

LEVIN FAUST AND FRANK G. HOGLAND, OF ROCKFORD, ILLINOIS, ASSIGNORS TO NATIONAL LOCK COMPANY, OF ROCKFORD, ILLINOIS, A CORPORATION OF ILLINOIS.

MORTISING-MACHINE.

955,834.

Specification of Letters Patent.   Patented Apr. 19, 1910.

Application filed January 27, 1906. Serial No. 298,128.

*To all whom it may concern:*

Be it known that we, LEVIN FAUST and FRANK G. HOGLAND, citizens of the United States of America, residing at Rockford, in the county of Winnebago and State of Illinois, have invented certain new and useful Improvements in Mortising-Machines, of which the following is a specification.

Our invention relates specifically to a machine for forming mortises in drawer-fronts for the reception of mortise-blocks; its object is the production of a machine of simple construction and easy operation for the purpose proposed; and it consists of certain new and useful features of construction and combinations of parts especially devised to that end, all as hereinafter fully described and specifically pointed out in the claims appended hereto.

Referring to the accompanying drawings, which form a part of this specification, Figure 1 is a side elevation of a mortising-machine embodying our invention. Fig. 2 is a top plan view of the same. Fig. 3 is a section, at the dotted line 3—3 in Fig. 2, of parts there shown with other parts wanting. Fig. 4 is a section, at the dotted line 4—4 in Fig. 3 of the complete machine. Fig. 5 is a partial section, at the dotted line 5—5 in Fig. 3 of the complete machine. Fig. 6 is an enlarged section, at the dotted line 6—6 in Fig. 4, of parts there shown. Fig. 7 is a section, at the dotted line 7—7 in Fig. 6, of parts there shown. Fig. 8 is a sectional detail of parts to be described hereinafter. Fig. 9 is a front view of a central segment of a drawer-front to which reference is made hereinafter in describing the operation of the machine. Fig. 10 is a longitudinal central section of the same.

Like letters of reference indicate corresponding parts throughout the several views.

A is the main frame of the machine and has horizontal bearings, Fig. 3, $A^1$ $A^2$ $A^3$ $A^4$ and a vertical bearing $A^5$ therein, to support parts to be described hereinafter.

B, Fig. 1, is the main shaft of the machine and is mounted in bearings $B^1$ therein.

$B^2$ $B^3$ are fast and loose pulleys on the shaft B.

$B^4$ is a large pulley fast on the shaft B and having a peripheral groove $B^5$ therein to engage a round belt.

C, Fig. 3, is a bit-spindle sleeve rotatably mounted in the bearings $A^1$ $A^2$, in the frame A, and increased in diameter, at its central portion, to form a driving-pulley $C^1$ thereon.

$C^2$ is a bit-spindle splined and longitudinally slidable in the sleeve C.

$C^3$ is a bit set into the socketed end of the spindle $C^2$.

$C^4$ is a belt connecting the pulleys $B^4$ $C^1$.

D is a bit-spindle sleeve rotatably mounted in the bearing $A^5$, in the frame A.

$D^1$ is a collar fast on the sleeve D.

$D^2$ is a bit-spindle splined and longitudinally slidable in the sleeve D.

$D^3$ is a bit set into the socketed end of the spindle $D^2$.

$D^4$ is a driving-pulley, having a groove $D^5$ in the periphery thereof and mounted fast on the spindle $D^2$.

$D^6$ is a round belt connecting the pulleys $B^4$ $D^4$.

$D^7$ are idlers, mounted loose on a fixed shaft $D^8$ and simply serve to change the direction of travel of the belt $D^6$.

F, Figs. 1 and 3, is a connecting-rod, mounted in the bearings $A^3$ $A^4$ in the frame A and longitudinally slidable therein.

$F^1$ is a cross-head, rigidly secured to the connecting-rod F, by means of a set-screw $F^2$, and having a circular bearing $F^3$ therein through which the bit-spindle $C^2$ projects and wherein it is rotatable.

$F^4$ are collars, mounted fast on the bit-spindle $C^2$ and serving—through their contact with the ends of the cross-head $F^1$—to cause such spindle $C^2$ to participate in the travel of the longitudinally-slidable connecting-rod F.

$F^5$ is a stop on the connecting-rod F and is adjustable thereon to regulate the inward travel of the spindle $C^2$ and its bit $C^3$.

G is a furcated lever, provided with transverse arms $G^1$ and bestriding and pivoted to the frame A at $g$.

$G^2$ is a cross-head, rigidly secured to the inner end of the connecting-rod F and pivotally mounted by its ends in the furcations $g^1$ of the lever G, at $g^2$.

$G^3$ is a spring, coiled about the connecting-rod F and included between the cross-head $G^2$ and the frame A and normally acting to maintain the bit $C^3$ at its inward limit of travel.

$G^4$ is a cross-head, having a circular bearing $G^5$ therein through which the spindle $D^2$ projects and wherein it is rotatable.

$G^6$ are collars, contacting the sides of the cross-head $G^4$ and fast to the spindle $D^2$.

$G^7$ are links, pivotally connecting the ends of the cross-head $G^4$ with the outer-end portions of the arms $G^1$ on the lever G, at $g^3$.

$G^8$ is a lever-actuated detent, slidably mounted in a bearing in the lever G and normally acted upon, by the spring $G^9$, to engage the teeth $g^4$ $g^5$ in the segment-rack $g^6$, to lock such lever G thereto.

H is a platen-carriage bracket, vertically adjustable on the frame A.

$H^1$ is a vertical shaft, mounted in a bearing $H^2$, on the frame A, and threaded throughout its exposed length, to adapt it to pass through and coöperate with a correspondingly-threaded nut $H^3$ fast to the bracket H, to raise and lower the latter.

$H^4$ is a bevel pinion fast to the shaft $H^1$.

$H^5$ is a bevel pinion, meshing with the pinion $H^4$ and mounted on a shaft in the bearing $H^6$ and having a socket $H^7$ (not shown) to admit a key, for rotating the same to raise and lower the bracket H.

$H^8$ $H^9$ are a bolt and nut for securing the bracket H to the frame A.

I is the platen-carriage of the machine and is slidably mounted, on the bracket H, by means of the slide-rods $I^1$, which are rigidly connected with such carriage I but are freely slidable in bearings $I^2$ in the bracket H. The carriage I is capable of reciprocating lateral travel indicated by the double arrow $a$ in Fig. 2.

$I^3$ $I^4$, Fig. 4, are, respectively, right and left hand screw-sections, rotatable in correspondingly-threaded opposite bearings $I^5$ $I^6$, in the bracket H, and having their adjacent ends inserted into and connected by a sleeve $I^7$—the former $I^3$ being splined thereinto and the latter $I^4$ being rigidly connected therewith. $I^4$ also has a collar $I^8$ fast thereon. The entire device composed of the parts $I^3$ $I^4$ $I^7$ $I^8$ will be hereinafter referred to as the platen-carriage adjusting-screw $I^9$. Rotation of such screw $I^9$ will cause the collar $I^8$ and free end $I^a$ of the part $I^3$ thereof to approach or recede from each other, at like speeds, according to the direction of its rotation. It is obviously therefore adapted to serve as adjustable stops to regulate the extent of the back and forth travel of the carriage I.

J is a horizontal bearing-plate on the free end of the arm $J^1$, projecting from and integral with the bracket H.

$J^2$ is a supporting-frame secured to the under side of the plate J by means of a set-screw $J^3$ and pintles $J^4$.

$J^5$ $J^6$, Fig. 8, are gage-blocks having respectively right and left hand screw-threaded openings $J^8$ $J^9$ extending transversely therethrough.

$J^{10}$ is a stem rotatably mounted in bearings $J^{11}$, in the frame $J^2$, and having respectively right and left hand screw-threads $J^{12}$ $J^{13}$ thereon adapted to actuate the gage-blocks $J^5$ $J^6$ toward and from each other, according to the direction in which such stem is rotated.

$J^{14}$ is the actuating-lever of the platen-carriage I, and is pivoted to the plate J, as shown in Fig. 6, by means of a circular bearing $J^{15}$ therein and a cylindrical lug $J^{16}$ projecting therefrom through such opening $J^{15}$, wherein it is maintained by means of a washer $J^{17}$ and set-screws $J^{18}$.

$J^{19}$ is a cylindrically-chambered detent-housing, rigidly connected with and depending from the lever $J^{14}$.

$J^{20}$ is a detent longitudinally slidable in the housing $J^{19}$ and connected, by means of a rod $J^{21}$, with an ordinary detent-lever $J^a$, Fig. 1, on the platen-carriage actuating-lever $J^{14}$.

$J^{22}$ is a spring coiled about the connecting-rod $J^{21}$ and normally maintaining the point of the detent $J^{20}$ in engagement with the stem $J^{10}$ at $a^1$ thereon.

$J^{23}$, Fig. 2, is a link pivotally connecting the carriage I with its actuating-lever $J^{14}$, at $J^{24}$.

K, Figs. 2 and 3, are rods mounted fast and horizontally in the upwardly-projecting lugs $K^1$, on the platen-carriage I, and serving as tracks for the platen to be described immediately hereinafter.

$K^2$ is a work-supporting platen and is slidably mounted, by means of bearings $K^3$ therein, on the rods K, whereon it is capable of reciprocating travel, indicated by the double arrow $a^2$ in Fig. 2.

$K^a$ are springs, coiled about the track-rods K and included between the lugs $K^1$, on the platen-carriage I and the platen $K^2$, and normally acting to maintain the latter at its outer limit of travel, as in Fig. 2.

$K^4$ is a screw for adjusting the platen $K^2$, on the track-rods K. The threaded portion of the screw $K^4$ passes through a correspondingly-threaded opening $K^5$, in a lug $K^6$, Fig. 3, on the platen $K^2$, and its unthreaded shank $K^7$ passes loosely through an opening $K^8$ in a lug $K^9$ on the platen-carriage I.

$K^{10}$ is a collar fast on the shank $K^7$ of the screw $K^4$.

$K^{11}$ is a stop mounted loose on the shank $K^7$, of the screw $K^4$, and having a set-screw $K^{12}$ tapped thereinto to secure it at any desired point on such shank $K^7$. If the screw $K^4$ be turned to the left, it will adjust the platen $K^2$ inward, against the action of the springs $K^a$. If it be turned to the right, it will, in conjunction with the springs $K^a$, adjust the same outward. After the adjustment of the platen $K^2$ either toward or from the drill $C^3$, in the manner indicated, the stop $K^{11}$ is next adjusted inward or outward and made fast to the stem of the screw $K^4$, by means of the set-screw $K^{12}$—the weight of the depending hand-wheel $K^{13}$ thereon preventing the turning of the platen-adjusting screw $K^4$ by the oscillations of the machine while in operation.

L is a rock-shaft mounted in the platen-carriage I.

$L^1$ are bell-cranks mounted fast at their angles to the rock-shaft L and contacting, with the free-end portions of their upper arms, lugs $L^2$ on the platen $K^2$.

$L^3$ is a foot-lever pivoted by one end at $L^4$ to the frame A.

$L^5$ are rods, pivotally connecting the free-end portions of the lower arms of the bell-cranks $L^1$ with the foot-lever $L^3$. If pressure be applied to the foot-lever $L^3$, it will be transmitted through the parts $L^5$ $L^1$ to the platen $K^2$ and slide the same inward, against the action of the springs $K^a$, until the stop $K^{11}$ strikes the lug $K^9$ on the carriage I. If pressure be withdrawn therefrom the springs $K^a$ will slide the platen $K^2$ outward until the collar $K^{10}$, on the adjusting-screw $K^4$ strikes the lug $K^9$ on the carriage I.

M, Figs. 4 and 5, are posts, projecting vertically upward and downward above and below the face of the platen $K^2$, of which they form an integral part.

$M^1$, Figs. 4 and 5, are longitudinally-slidable clamp-rods mounted in the vertical bearings $M^2$ in the posts M and terminating, at their lower ends, in eccentric-straps $M^3$.

$M^4$ are clamps, shod with felt $M^5$ and adjustably secured to the rods $M^1$, by means of set-screws $M^6$, Fig. 3.

$M^7$, Fig. 5, is a rock-shaft, mounted in the lower-end portions of the posts M and having eccentrics $M^8$ mounted fast thereon and housed in and interiorly contacting their straps $M^3$ on the rods M.

$M^9$ is a crank fast to the rock-shaft $M^7$.

$M^{10}$ is a bell-crank lever, mounted by its angle and at $M^{11}$ on one of the posts M.

$M^{12}$ is a link, pivotally connecting the free-end portion of the short arm $M^{13}$ of the bell-crank-lever $M^{10}$ with the free-end portion of the crank $M^9$ on the rock-shaft $M^7$.

The machine is adjusted for work as follows: A drawer-front N is placed and clamped on the platen $K^2$, in the position shown in Fig. 3. The platen is next adjusted inward or outward, according as may be required, by means of the adjusting-screw $K^4$, in the manner already described, until the point $N^1$ (which is the top of the key-hole proposed to be formed), on the drawer-front N, Fig. 9, is immediately below the point of the bit $D^3$. The gage-blocks $J^5$ $J^6$, Fig. 8, are then adjusted toward or from each other, by means of the right and left hand threaded stem $J^{10}$, until the distance between them is sufficient to insure a lock-mortise proper, $N^2$, Fig. 9, of the desired width. The stops $I^a$ $I^3$, on the platen-carriage adjusting-screw $I^9$, Fig. 4, are then adjusted toward or from each other, until the platen-carriage I is adapted to travel back and forth a sufficient distance to insure the forming of a selvage-mortise $N^3$ of the desired length.

The operation of the adjusted machine is as follows: The lever $J^{14}$ is swung to the left, until the left side of its detent $J^{20}$, Fig. 8, contacts the gage-block $J^6$ at $a^5$, the lever G, Fig. 3, is then swung backward until the bit $C^3$ is thereby advanced and bores a hole $n$, Fig. 9, into the edge of the drawer-front N. The lever G is next returned to and locked in the position shown in Fig. 3, by its detent $G^9$, and the lever $J^{14}$ is then swung to the right to the position shown in Fig. 8, and its hand-lever $J^a$, Fig. 1, released, permitting the spring $J^{22}$ to press the end of the detent $J^{20}$ against the threaded stem $J^{10}$ at $a^1$, Fig. 8, and midway between the gage-blocks $J^5$ $J^6$. The lever G is then again swung backward until the bit $C^3$ is thereby advanced and bores a second hole $n^1$, Fig. 9. The lever G is next swung forward, until the bit $C^3$ is completely withdrawn from the edge of the drawer-front N and the point of the bit $D^3$ is immediately above and descending enters the upper face of such drawer-front, at the point $N^1$ thereon, Fig. 9, and while the bit $D^3$ is still in the position just described and penetrating the upper face of the drawer-front, the operator presses the lever $L^3$ downward with his foot, thereby sliding the platen $K^2$ inward until the stop $K^{11}$ on the stem $K^7$ of the platen-adjusting screw $K^4$ strikes the lug $K^9$ on the platen-carriage I, with the result that the drawer-front N will also have traveled therewith inward, a like distance, and the bit $D^3$ will have cut a keyhole $n^2$ transversely therein, Fig. 9, extending from $N^1$ to $N^4$. The platen $K^2$ is then released by the operator and restored to its former position, by the action of the springs $K^a$, and the lever G is again returned to and locked in the position shown in Fig. 3. The lever $J^{14}$ is again swung to the right, until the right side of its detent $J^{20}$ contacts the gage-block $J^5$, at $a^6$, and the lever G is swung backward until the bit $C^3$ advances and bores a hole $n^3$ in the edge of the drawer-front N. The lever $J^{14}$ is then swung to the left until its detent $J^{20}$ contacts the gage-block $J^6$, at $a^5$ (the bit $C^3$ being still inserted into the edge of the drawer-front N to the bottoms of the holes $n$ $n^1$ $n^3$ therein) thereby cutting away the partitions between such holes and completing the lock-mortise proper, $N^2$, Fig. 10. The detent $J^{20}$ is then withdrawn completely from between its gage-blocks $J^5$ $J^6$ and swung still farther to the left, until the platen-carriage I strikes the end $I^a$ of the adjusting-screw $I^9$, and the lever G is swung backward and locked in the detent $g^4$, thereby advancing the point of the bit $C^3$ a little distance into the edge of the drawer-front N, at $N^6$, the lever $J^{14}$ is then swung to the right until the carriage I strikes the stop $I^8$ on the adjusting-screw $I^9$, during which movement of the platen-carriage I the bit $C^3$ will have cut the selvage-mortise extending from $N^6$ to $N^7$, Fig. 9, therein. The lever G is then returned to the position shown in Fig. 3 and mortised drawer-front N removed from the platen $K^2$.

Having fully described our invention, what we claim as new and desire to secure by Letters Patent, is—

1. In a mortising-machine, in combination, a main frame, a bit-spindle sleeve having a bit spindle splined therein and mounted horizontally in the frame, a bit-spindle sleeve having a bit spindle splined therein and mounted vertically in the frame, a furcated lever provided with transverse arms and pivoted vertically to the frame, a cross-head pivoted by its ends between and in the furcations of the furcated lever, a cross-head having a bearing therein through which the rear-end portion of the horizontal bit-spindle projects and in which it is rotatable, means for preventing endwise movement of the horizontal bit-spindle in its bearing in the cross-head, a horizontal rod rigidly connecting the cross-head on the horizontal bit-spindle with the cross-head in the furcated lever, a cross-head having a bearing therein through which the upper-end portion of the vertical bit-spindle projects and in which it is rotatable, means for preventing endwise movement of the vertical bit-spindle in its bearing in the cross-head, links pivotally connecting the ends of the cross-head on the vertical bit-spindle with the outer end-portion of the transverse arms on the furcated lever and means for rotating the bit-spindle sleeves, substantially as described.

2. In a mortising-machine, in combination, a bearing-plate J, a supporting-frame $J^2$ secured thereto, gage-blocks $J^5$ $J^6$ having respectively right and left hand screw-threaded openings $J^8$ $J^9$ extending transversely therethrough, a stem $J^{10}$ rotatably mounted in the frame $J^2$ and having respectively right and left hand screw-threads $J^{12}$ $J^{13}$ thereon adapted to actuate the gage-blocks toward and from each other, a lever $J^{14}$ pivoted to the bearing-plate J, a detent-housing $J^{19}$ on the lever $J^{14}$, a detent $J^{20}$ longitudinally slidable in the housing $J^{19}$, a detent-lever $J^a$ pivoted to the lever $J^{14}$, a rod connecting the detent $J^{20}$ with the detent-lever $J^a$ and a spring $J^{22}$ normally maintaining the free end of the detent $J^{20}$ in contact with the stem $J^{10}$, a platen-carriage bracket H whereto the bearing-plate J is rigidly connected, a platen-carriage I slidably mounted on the bracket H and a link $J^{23}$ pivotally connecting the carriage I with the lever $J^{14}$, substantially as described.

3. In a mortising-machine, in combination, a main frame, bit-spindle sleeves C D having bit spindles $C^2$ $D^2$ splined therein and mounted in the frame, a furcated lever G provided with transverse arms $G^1$ and pivoted to the frame, a cross-head $G^2$ pivoted by its ends in the furcations $g^1$ of the lever G, a cross-head $F^1$ having a bearing $F^3$ therein through which the rear-end portion of the bit-spindle $C^2$ projects and in which it is rotatable, fast collars $F^4$ on the bit-spindle $C^2$ for preventing it from moving endwise in its bearing in the cross-head $F^1$, a rod F connecting the cross-heads $G^2$ $F^1$, a cross-head $G^4$ having a bearing $G^5$ therein through which the upper-end portion of the bit-spindle $D^2$ projects and in which it is rotatable, fast collars $G^6$ on the bit-spindle $D^2$ for preventing it from moving endwise in its bearing in its cross-head $G^4$, links $G^7$ pivotally connecting the ends of the cross-head $G^4$ with the transverse arms $G^1$ on the furcated lever G and means for rotating the bit-spindle sleeves C D, substantially as described.

4. In a mortising machine, in combination, a supporting structure, gage-blocks having respectively right and left hand screw-threaded openings extending therethrough, a stem rotatably mounted in said structure and having respectively right and left hand screw-threads thereon adapted to actuate the gage-blocks toward and away from each other, a lever pivoted to said structure, a member on said lever adapted to engage said gage-blocks when said lever is swung, and a platen-carriage arranged to be moved by said lever.

5. In a mortising machine, in combination, a supporting structure, gage-blocks having respectively right and left-hand screw-threaded openings extending therethrough, a stem rotatably mounted in said structure, and having respectively right and left-hand screw-threads thereon adapted to actuate the gage blocks toward and away from each other, a lever pivoted to said structure, a member on said lever adapted to engage said blocks when said lever is swung, said member being arranged to engage said stem to lock said lever in a central position, and a platen-carriage arranged to be moved by said lever.

6. In a mortising machine, in combination, a main frame, bit-spindle sleeves having bit-spindles splined therein and mounted in the frame, a lever provided with a transverse arm and pivoted to the frame, a cross-head through which one of said bit-spindles projects and in which it is rotatable, means for preventing the last mentioned bit-spindle from moving endwise in the cross-head, means connecting said cross-head with said lever, a cross-head through which the other bit-spindle projects and in which it is rotatable, means for preventing the last mentioned bit-spindle from moving endwise in its cross-head, a connection between the last mentioned cross-head and the transverse lever-arm, and means for rotating the bit-spindle sleeves.

In testimony whereof we have signed our names to this specification in the presence of two witnesses.

LEVIN FAUST.
FRANK G. HOGLAND.

Witnesses:
L. L. MORRISON,
NELLIE E. ENNETT.